United States Patent [19]

Churchill et al.

[11] Patent Number: 4,704,906

[45] Date of Patent: Nov. 10, 1987

[54] DYNAMIC AIR GAP MEASURING DEVICE FOR USE WITH ROTATING ELECTRICAL MACHINERY

[75] Inventors: Thomas L. Churchill, North Bend; James M. Ross, Bothell, both of Wash.

[73] Assignee: Electric Power Research Institute, Palo Alto, Calif.

[21] Appl. No.: 850,234

[22] Filed: Apr. 10, 1986

[51] Int. Cl.⁴ ............................................. G01N 29/00
[52] U.S. Cl. .................................. 73/660; 73/597; 73/117.3; 73/627; 340/683
[58] Field of Search ................ 73/597, 598, 660, 116, 73/117.3, 627; 340/682, 683

[56] References Cited

U.S. PATENT DOCUMENTS

| | | |
|---|---|---|
| 4,368,641 | 1/1983 | McLeod, Jr. .......................... 73/597 |
| 4,413,519 | 11/1983 | Bannister et al. ..................... 73/660 |
| 4,422,333 | 12/1983 | Leon ..................................... 73/660 |
| 4,423,635 | 1/1984 | Senicourt et al. .................. 340/682 |
| 4,452,074 | 6/1984 | Shelomentsev et al. ............. 73/660 |
| 4,464,935 | 8/1984 | McHugh ............................. 340/683 |

*Primary Examiner*—Howard A. Birmiel
*Attorney, Agent, or Firm*—Flehr, Hohbach, Test, Albritton & Herbert

[57] ABSTRACT

The air gap between a rotor and a stator in rotating electrical machinery is determined using sonar techniques. An ultrasonic signal transmitter and receiver are mounted on one of the rotor and stator for transmitting ultrasonic signals to the other of the rotor and stator and receiving reflections therefrom. The time between signal transmission and reflected signal reception is determined, and the spacing of the rotor and stator is determined from the time, the velocity of sound, and the speed of rotation of the rotor.

10 Claims, 6 Drawing Figures

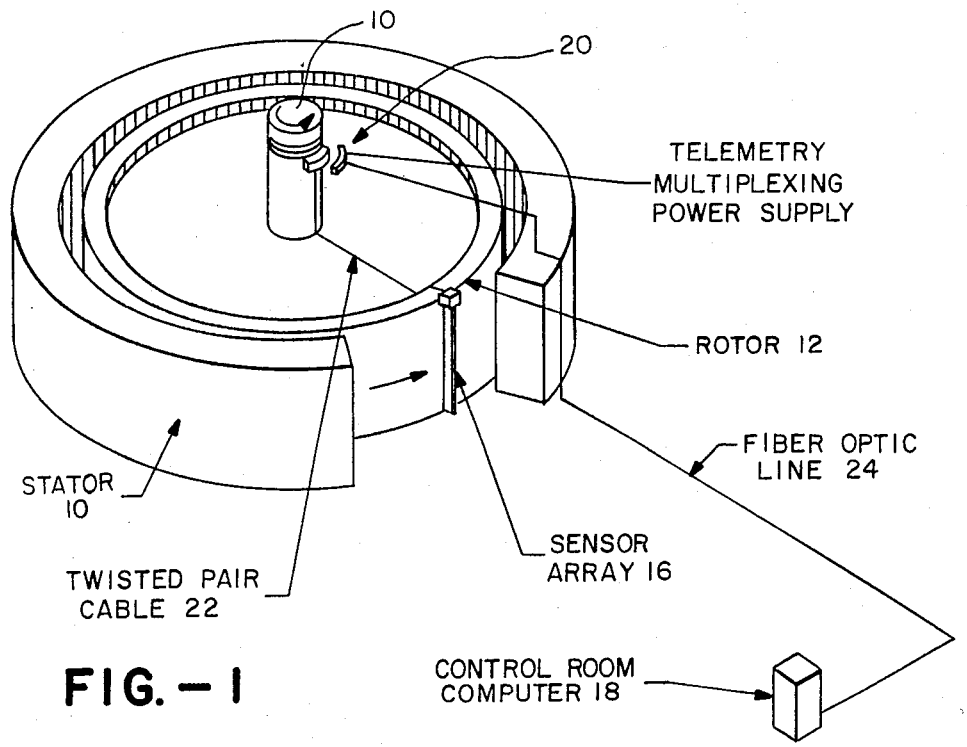
FIG.—1
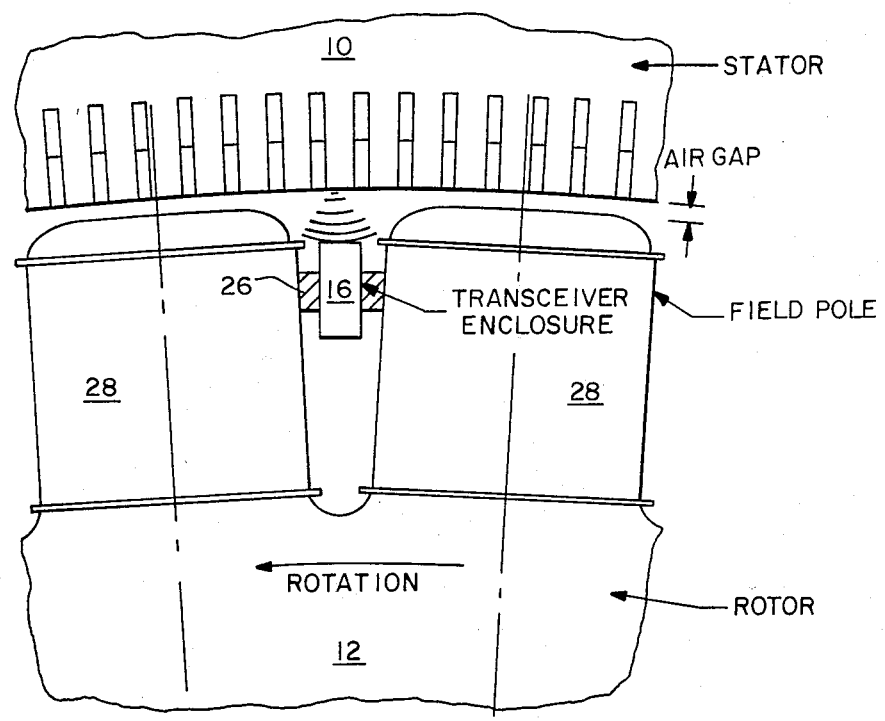
FIG.—2

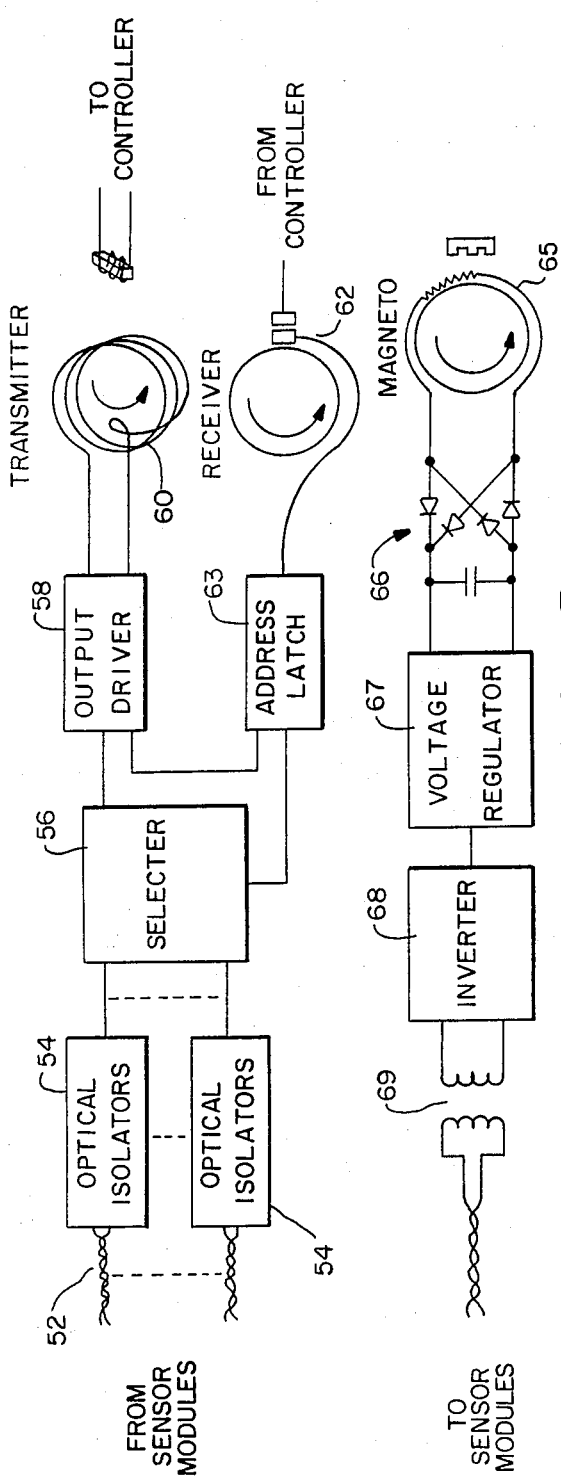
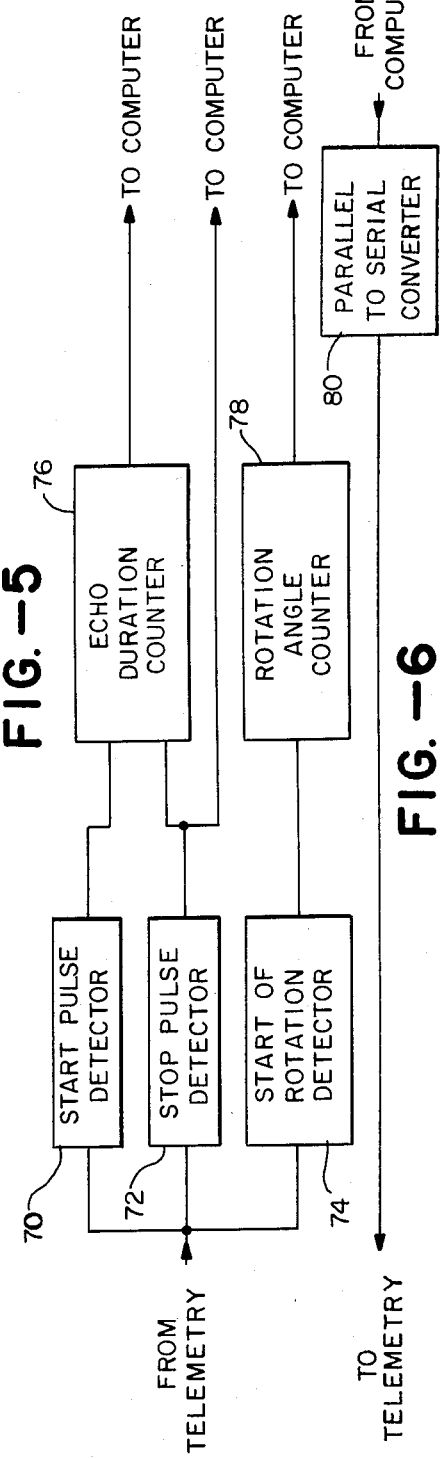
FIG.—5
FIG.—6

DYNAMIC AIR GAP MEASURING DEVICE FOR USE WITH ROTATING ELECTRICAL MACHINERY

BACKGROUND OF THE INVENTION

This patent application is related to copending application Ser. No. A-43795 for Acoustic Sensor for Rotary Machinery filed concurrently herewith.

This invention relates generally to rotating electrical machinery, and more particularly the invention relates to measurement of the air gap between the rotar and stator of such machinery.

Utilities operating large hydroelectric generators have been and continue to be concerned with the dynamic behavior of the air gaps in the machines. Thermal expansions and contraction coupled with centrifugal and magnetic forces produce movement within the mechanical structure of the generator leading to changes in the air gap dimensions. In a worse case situation, the air gap can actually close leading to rotor-stator contact damage. Even when closure does not occur, azimuthal variations in air gap result in comparable variations in air gap magnetic reluctance. As a consequence, there are related variations in magnetic flux coupling of the armature and thus variations in both induced voltage (which is a linear function of flux) and the magnetic force (which is a function of the square of flux density). Since such systems are invariably connected to a low impedance power grid, variations in induced voltage from terminal voltage are compensated by variations in coil currents, known as split phase currents, which in turn cause variations in dissipation and temperature rise.

Attempts have been made to measure dynamic air gap behavior. One such attempt which has provided to be relatively successful in disclosed by Talas and Toom. "Dynamic Measurement and Analysis of Air Gap Variations in Large Hydroelectric Generators", *IEE Transactions for Power Apparatus and Systems*, Vol. PAS-102, N.9, Sept. 1983, pages 3098-3106. In this systems two bundles of optical fibers are routed from rotor hub to rim where the fiber ends are intermixed and/or oriented so as to be colinear with machine axis and in view of a strip of glass-beaded, retro-reflectors. As the rotor spins, an infrared beam issuing from the fibers of one bundle, reflecting and entering the fibers of the second bundle, is periodically and partially obscured by fins protruding from cooling slots in the stator. A change in the fraction of the fiber obscured by the partial blockage of each fin is a measure of the change in air gap dimensions.

The present invention is directed to an improved apparatus and a method for measuring air gap by employing sonar technology. Sonar, or sound navigation ranging, is well known for use in distance measuring. For example, Duncan, U.S. Pat. No. 4,240,152 utilizes sonar for providing both distance and location information relative to a moving vehicle. Soltz U.S. Pat. No. 4,470,299 utilizes ultrasonic echo ranging to measure the level of a liquid in an open channel or other liquid container. Shelomentsev et al U.S. Pat. No. 4,452,074 utilizes ultrasonic wave propagation for monitoring the moving components of an internal combustion engine. Spectral analysis of reflected signals is employed to determine performance characteristics of the mechanism.

In accordance with the invention sound wave transmission and reception means is mounted to provide a continual measurement of air gap by transmitting an ultrasonic pulse across the air gap and receiving a reflection of the pulse. The transmission and reception means can be mounted on the stationary stator for detecting changes in air gap due to variations in the rotor, or the transmitter and receiver means can be mounted on the rotor for detecting variations in the stator.

In a preferred embodiment the transmitter and receiver comprise a single transducer element functioning as a transceiver. In this embodiment the round trip pulse propagation time is of sufficient duration to allow the transceiver to damp to its quiescent state for return of the reflected pulse.

With the transmitter and receiver means mounted on the rotor, telemetry means is employed in transmitting signals for controlling the transmitter and receiver means and for transmitting signals from the transmitter and receiver means to a gap distance determining computer.

The invention and objects and features thereof will be more readily apparent from the following detailed description and appended claims.

BRIEF DESCRIPTION OF THE DRAWINGS

FIG. 1 is a perspective view partially in section of an electric generator including an air gap monitor in accordance with one embodiment of the invention.

FIG. 2 is a section view of a portion of the stator and rotor of the generator of FIG. 1 illustrating the positioning of the air gap monitoring apparatus therein.

FIG. 5 is a functional block diagram of telemetry apparatus in the system of FIG. 1.

FIG. 6 is a functional block diagram of computer interface circuitry for use in the system of FIG. 1.

DETAILED DESCRIPTION OF THE SPECIFIC EMBODIMENTS

Figure 3:
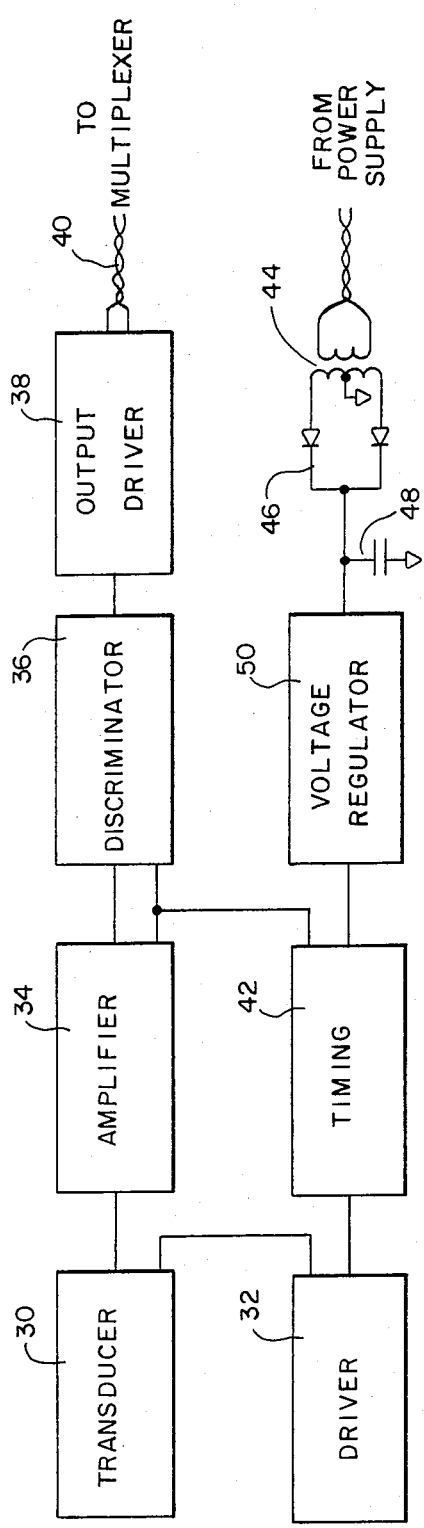
FIG. 3 is a functional block diagram of a transceiver implementation of the air gap monitor.

FIG. 1 is a perspective view partially in section of an electrical generator including air gap monitoring apparatus in accordance with the invention. The generator includes a generally cylindrical stator 10 in which a rotor 12 rotates on a shaft 14. The stator is shown partially in section to illustrate a sensor array 16 of the air gap monitor. In this embodiment the air gap monitor is mounted on the rotor.

The sensor array 16 is electrically and optically coupled to a central computer 18 through an electrical and optical telemetry coupler shown generally at 20. One part of the coupler 20 is mounted to shaft 14 and is electrically connected to the sensor array 16 by means of a twisted pair cable 22. The other portion of the coupler 20 is mounted to the stator structure and is periodically aligned with the rotor mounted portion of the coupler as the shaft rotates. The stator portion of coupler 20 is connected to the computer 18 through a fiber optic link 24.

FIG. 2 is a section view of a portion of the stator 10 and the rotor 12 and illustrates the positioning of the sensor array 16 between field pole pieces 28 of the rotor. The sensor array 16 transmits pulsed ultrasonic waves across the air gap between the rotor and the stator and receives reflections of the pulses. The time required for transmitting a pulse and receiving the reflection thereof is indicative of the air gap spacing. The housing for the sensor array 16 is preferably a machined aluminum container having a rectangular cross section, and the aluminum housing is mounted to the pole pieces 28 by suitable means such as a stainless steel support frame or bridge 26.

The transmitter and receiver of the air gap monitor can be separate devices or a single transceiver device. FIG. 3 is a functional block diagram of one embodiment in which a single ultrasound transducer 30 is employed as a transceiver. Transducer 30 is energized by pulse generator 32, and a reflection of the signal from the stator is received by the transducer 30. Transducer 30 generates an electrcal signal in response to the reflection, and the electrical signal is amplified in amplifier 34 and applied through discriminator 36 (e.g. level sensor) to an output driver 38. The output driver 38 converts the discriminator output to a low impedance signal without noise contamination and transmits a stop timing signal or stop pulse from discriminator 36 through the twisted wire pair 40 to the telemetry coupler, as shown in FIG. 5. The timing circuitry 42 initiates the driver 32 and transmits a start timing signal to deactivate amplifier 34 except during the period of time a reflected signal is received by transducer 30. Power for the circuitry on the rotor is provided through a 20 KHz square ware transmitted to transformer 44, converted to dc by full wave rectifier 46 and capacitor 48, and then applied to regulator 50.. The power supply and the telemetry employed in the described system is known in the prior art.

Figure 4:
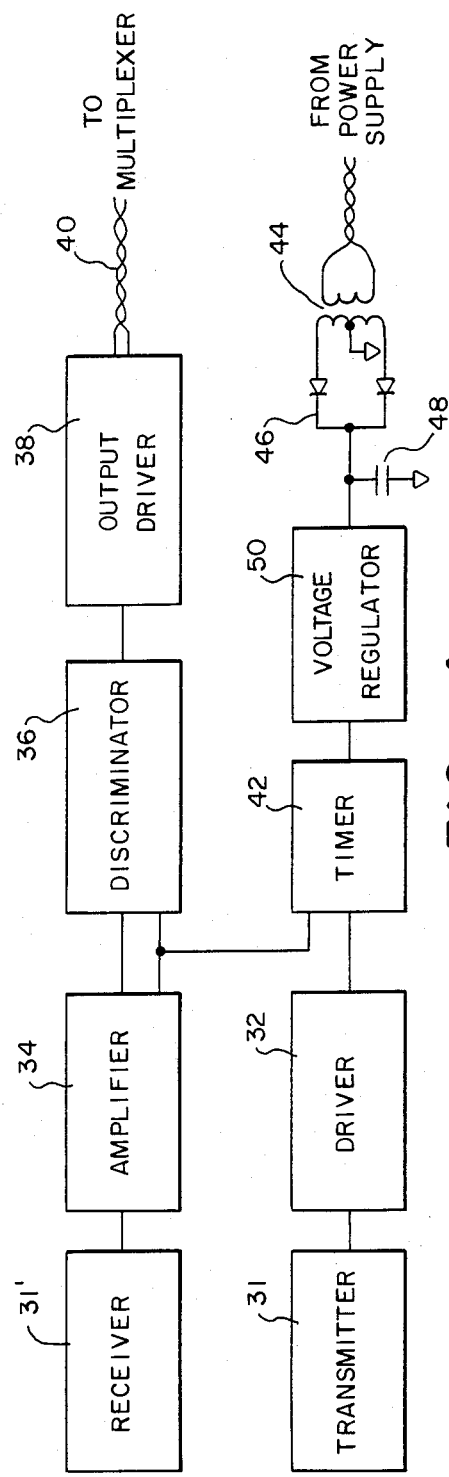
FIG. 4 is a functional diagram of a separate transmitter and receiver configuration of the air gap monitor.

FIG. 4 is circuitry similar to that of FIG. 3 but in which separate transmitting and receiving transducers 31 and 31' are employed. Other components of the circuitry of FIG. 4 all correspond to components of the circuitry of FIG. 3 as indicated by like reference numerals.

One air gap sensor has been designed for use for rotor mounting in a 145 MVA, 120 rpm, 12 section, salient pole, hydroelectric generator. This machine has a rotor diameter of 32.25 feet, an air gap of 0.705 inch, 504 armature coil slots, and 60 field poles. The sonar air gap monitor utilizes a 50 microsecond width burst of pulses driving a 200 KHz piezoelectric acoustic transducer. Both driver and transducer are mounted between two field poles as described with reference to FIG. 2, with the transducer access oriented towards the stator, as shown in FIG. 2. When pulsed, the resulting ultrasonic sound wave is launched through an aperture toward the stator, distance "x" away, and the first reflection returns at a time "t" later as given by $$t=2x/(v^2-s^2)^{\frac{1}{2}}$$

where "s" is the tangential velocity of the sensor and "v" is the velocity of sound in air given by $$v=49.04(T)^{\frac{1}{2}}=1200 \text{ feet/sec}$$

for T=600° R. (140° F. or 60° C.). The sensitivity of time to distance is $$dt/dx=2/(v^2-s^2)^{\frac{1}{2}}=t/x$$

For a transducer-to-stator distance of 0.333 feet and a pole tip speed of 203 feet/sec (s=201 feet/sec), the round trip time and sensitivity is 563 $\mu$secs and 141 $\mu$secs/inch, respectively.

In order to resolve an air gap variations of 0.1 inches, it is necessary to resolve the round trip time of a 50 $\mu$sec wide pulse burst to approximately 14 $\mu$secs. This capability is assured by the geometry of the region where the sensor is mounted. Ghost reflections will necessarily have to travel much longer distances than the direct path before arriving at the transducer. This resultant delay greatly simplifies discrimination between primary and secondary return pulses.

During operation the sensor is scanning the stator. In order to achieve proper signal-to-noise ratio, it is necessary for the transceiver to have an emission/acceptance cone sufficiently wide to capture the primary echo. The round trip time of the sound pulse and the sensor's tangential velocity correspond to a sweep distance of 1.36 inches and a sweep cone angle of 19.3 degrees. Since the principal lobe of a piezoelectric transducer is typically 20 degree wide, the sensor for this particular machine is accommodated by a transceiver design. For machines having much higher sweep speeds, it is necessary to employ dual transducers with the transmitter angled forward by the sweep cone half-angle and the receiver similarly angled rearward. Deviations in receiver frequency due to doppler shifting by virtue of receiver motion are not a problem. The stator will receive and reflect an upshifted note, about 6% at 20°, and the receiver will receive a downshifted note by exactly the same amount.

The transducer pulse repetition rate depends on the azimuthal resolution required. There is an upper limit which is related to the time for a predecessor pulse's reflections to damp out. For the described embodiment, it can be assumed that the damping time is five times the round trip time. In this case, the maximum rate is 360 Hz, which is downgraded to 330 Hz in order to avoid electronics problems with 60 Hz harmonics. Even at this rate the azimuthal resolution for the above machine is 2.2 mechanical degrees or about 14 measurements per section and 165 measurements around the entire machine.

The number of sensors mounted on a machine depends on whether the stator, rotor, or both are suspected of distorting during machine operation. If the stator alone is suspect, a single sensor mounted on the rotor would suffice. If the rotor or both rotor and stator are suspect, or if there is no idea as to which component may be distorting, the use of three sensors spaced equally around the rotor will permit determination of all combinations as follows. (1) Stator alone distorts: During a complete revolution, all three sensor outputs will show identical, position-dependent variations in air gap, but with 120 mechanical degrees of displacement. (2) Rotor alone distorts: During a complete revolution, all three sensor outputs will show constant, but different, outputs. (3) Both components distort: During a complete revolution, all three SAM outputs will be similar in shape, but of differing amplitudes, as well as 120° out of phase.

The signals from the output driver 38 are communicated to the computer through any suitable telemetry system, such as the system shown in FIG. 5. With reference to FIG. 5, the signals from the sensor modules are applied through lines 52, through optical isolator 54 and MUX selector 56 to an output FM driver 58. FM driver 58 continuously drives a transmitting coil 60. Coil 60 is coupled to a derrite antenna 61 which generates a signal that is amplified and converted to light pulses. The light pulses are sent to the controller computer through a fiber optic cable. Optical signals from the controller are transmitted once per revolution through a coupler 62 to an address latch 63 for sensor selection. The transmitted code is stored in address latch 63 and is used to determine which sensor module output to send, and the reception of the code will cause a long pulse to be transmitted by the output driver. This long pulse is detected by the system computer and used to indicate when the rotor is starting a new revolution with another sensor sending data. Power to the sensors is provided using known techniques such as the use of magnets 65, full wave rectifier 66, regulator 67, inverter 68, and transformer 69.

FIG. 6 is a functional block diagram of the controller interface. Optical sensor pulses from the telemetry system are restored to electrical pulses, then monitored by a start pulse detector 70, a stop pulse detector 72, and a start of rotation detector 74. When a start pulse is detected, echo counter 76 is reset and started. When a stop pulse is detected, the echo duration counter 76 is stopped, and the computer is triggered to read the echo duration count. The start of rotation detector 74 synchronizes a rotation angle counter 78, which is a phase locked loop circuit that keeps track of the angular position of the rotor. Data from the rotation angle counter 78 is read by the computer when the echo duration 76 is read. The parallel data codes from the computer, which select the desired sensor data, are converted to serial code by converter 80, and the bits of the serial code are then transmitted through a fiber optic cable to the optical transmitter at the generator and then converted back to parallel bits at the transmitter.

The dynamic air gap measuring device is particularly useful with large rotating electrical machinery as described, but can be employed for any non-contact measurement of the dynamic gap between two surfaces moving with respect to each other. Thus, while the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Apparatus for measuring air gap between a rotor and a stator in rotating electrical machinery comprising
    ultrasound signal transmitter means for transmitting a pulsed signal,
    ultrasound signal receiver means for receiving a pulsed echo signal and generating an electrical receiver signal in response thereto,
    means for mounting said signal transmitter means and said signal receiver means on one of said rotor and stator whereby signals can be transmitted to the other of said rotor and stator and reflected back to said signal receiver means, and
    means for determining the time between signal transmission and echo signal reception and determining the air gap between the rotor and said stator.

2. Apparatus as defined by claim 1 wherein said signal transmitter means comprises a first ultrasonic transducer and said signal receiver means comprises a second ultrasonic transucer.

3. Apparatus as defined by claim 1 wherein said signal transmitter means and said signal receiver means comprise a single ultrasonic transducer.

4. Apparatus as defined by claim 1 wherein said signal transmitter means includes timing means for controlling the transmission of signals and generating a start pulse, driver means responsive to said timing means for applying driving signal to said signal transmitter means, amplifier means for receiving and amplifying said electrical receiver signal, and a discriminator responsive to said electrical receiver signal and generating a stop pulse.

5. Apparatus as defined by claim 4 wherein said discriminator comprises a level sensitive pulse detector.

6. Apparatus as defined by claim 1 wherein said means for determining the air gap includes a computer and further including telemetry means for transmitting signals to and from said computer.

7. Apparatus as defined by claim 6 and further including a plurality of signal transmitter means and signal receiver means mounted in spaced relationship and further including multiplexer means for selecting one of said plurality of signal transmission means and signal receiver means.

8. A method of measuring air gap between a rotor and a stator in rotating electrical machinery comprising the steps of
    mounting signal transmitter and receiver means on one of said rotor and stator,
    transmitting signals to the other of said rotor and stator and receiving reflected signals therefrom,
    determining the time between signal transmission and reflected signal reception, and
    determining from said time the air gap between said rotor and said stator.

9. The method as defined by claim 8 wherein said step of mounting signal transmitter and receiver means includes mounting a plurality of transmitter and receiver means about one of said stator and rotor.

10. The method as defined by claim 9 and further including the step of periodically activating each of said plurality of signal transmitter and receiver means.

* * * * *